Dec. 7, 1926.
L. K. RIGGS
1,609,773
PRODUCTION OF ANHYDROUS HYDROSULPHITES
Filed Dec. 23, 1924   2 Sheets-Sheet 1
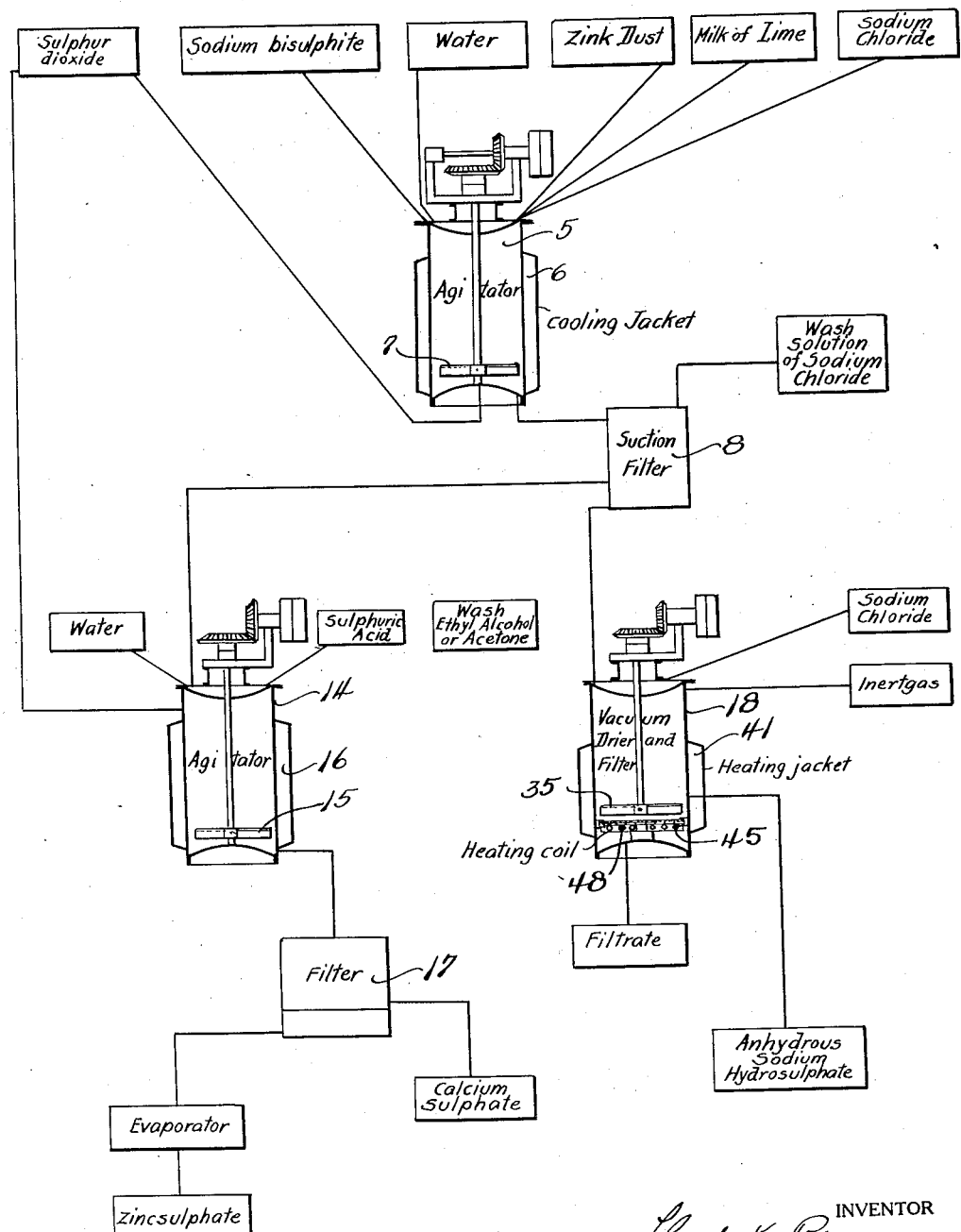

Dec. 7, 1926. 1,609,773
L. K. RIGGS
PRODUCTION OF ANHYDROUS HYDROSULPHITES
Filed Dec. 23, 1924  2 Sheets-Sheet 2
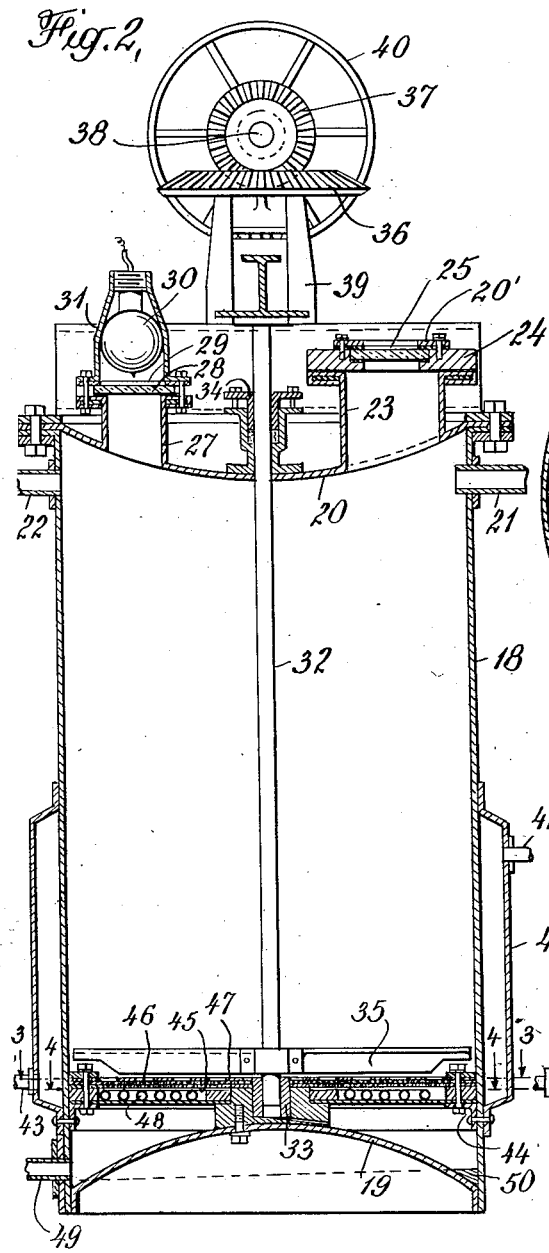
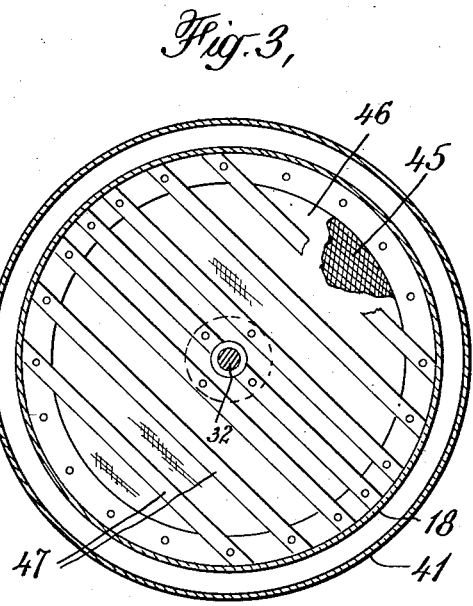
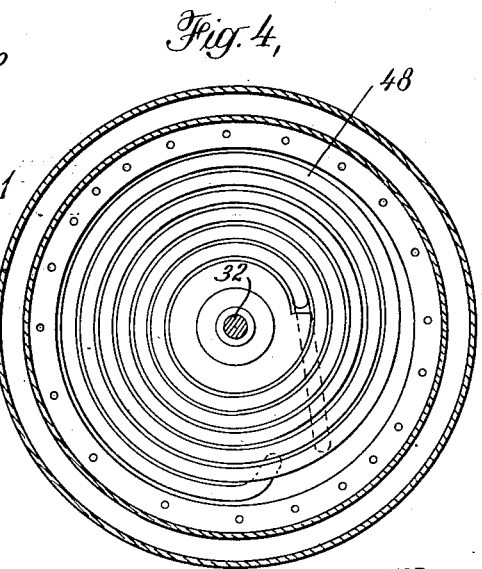
Lloyd K. Riggs INVENTOR
BY
Pennie Davis Marvin & Edmonds
his ATTORNEYS Patented Dec. 7, 1926.

1,609,773

UNITED STATES PATENT OFFICE.

LLOYD K. RIGGS, OF NEW BRUNSWICK, NEW JERSEY, ASSIGNOR TO E. R. SQUIBB AND SONS, OF NEW YORK, N. Y., A CORPORATION OF NEW YORK.

PRODUCTION OF ANHYDROUS HYDROSULPHITES.

Application filed December 23, 1924. Serial No. 757,613.

This invention relates to the production of anhydrous sodium hydrosulphite, and particularly to a method whereby the water of crystallization can be separated and withdrawn from the crystallized salt in a simple, efficient and inexpensive manner.

Sodium hydrosulphite containing water of crystallization is an extremely unstable compound in the presence of air. It oxidizes spontaneously at ordinary temperatures and cannot be preserved for any length of time except by the observation of special precautions. The anhydrous salt is, however, quite stable and has a wide variety of uses in the arts. Its preparation presents numerous difficulties because the salt is separated originally in the hydrated form and as such must not be exposed to the atmosphere.

It is the object of the present invention to provide a method whereby the hydrated salt can be prepared under conditions which preclude decomposition and converted without access of the atmosphere into the anhydrous and stable form.

Further objects and advantages of the invention will be apparent as it is better understood by reference to the following specification and the accompanying drawing, in which—

Fig. 1 is a flow sheet indicating the steps of the method;

Fig. 2 is a vertical section through a combined filter and vacuum drier which is employed preferably in the separation of water of crystallization from the hydrated sodium hydrosulphite;

Fig. 3 is a section on the line 3—3 of Fig. 2; and

Fig. 4 is a section on the line 4—4 of Fig. 2.

To successfully separate the water of crystallization from hydrated sodium hydrosulphite, it is essential that the mass of crystals be heated in a substantially uniform manner to the temperature at which the separation of the water occurs. I have discovered that uniformity of heating is accomplished most readily by the maintenance of water vapor in contact with the sodium hydrosulphite crystals until the separation of the water of crystallization occurs. This separation is a sharply defined reaction and is substantially instantaneous when carried out under the conditions of the method defined herein. So long as the material is maintained at a temperature above that at which sodium hydrosulphite can exist in the hydrated form, the presence of water or water vapor does not affect the anhydrous product. The water and water vapor must, however, be withdrawn before the material is permitted to cool. Consequently the method involves the heating of the separated and moist crystals in a suitable closed vessel so that the atmosphere contains a proportion of water vapor until the separation of the water of crystallization has been effected and the withdrawal of substantially all of the water and water vapor by the application of a suitable vacuum while the material is held at a temperature which precludes recombination of the water with the anhydrous product.

In carrying out the invention sodium bisulphite, which may be of the ordinary commercial grade, is dissolved in water in a tank 5 as shown in Fig. 1. The tank is provided preferably with a cooling jacket 6, a close fitting cover and a mechanical agitator 7. Zinc dust, (preferably containing at least 97 to 98% of zinc), is added slowly to the solution so that the temperature of the reaction does not exceed 38° C. The cooling jacket assists in maintaining the desired temperature. After the addition of the zinc, sulphur dioxide is supplied and the reaction is allowed to proceed to completion, usually requiring about three hours. Milk of lime is then stirred in and the mixture is slowly agitated for at least twenty minutes. It is desirable to exclude lime from the final product of the reaction and this is accomplished by the addition of a proportion of sodium chloride which prevents the calcium compounds from entering the solution. Approximately 148 grams of sodium chloride per liter of solution should be added.

The mixture is filtered preferably on a suction filter as indicated at 8 in Fig. 1, and the solution is collected in a vacuum receiver 18. The vacuum receiver will be more fully described hereafter but consists primarily of a closed vessel having a heating jacket 41, a filter comprising a coarse meshed fabric 45 and a filter cloth 46 near its bottom and a heating coil 48 beneath the filter medium. An agitator 35 is also provided.

Preferably the precipitate in the suction filter 8 is washed several times with a solution containing approximately 14% of sodium chloride and the washings are added to the solution in the vacuum receiver. A further quantity of sodium chloride is added to the solution which is stirred rapidly for a sufficient period to permit the crystallization of the sodium hydrosulphite. The vacuum receiver is then closed and the suction is applied to draw the solution through the filter medium, thus leaving the hydrosulphite thereon.

The vacuum is broken preferably by the introduction of an inert gas such as nitrogen, carbon dioxide, or illuminating gas, and the agitator is started while heat is applied to the mass to bring the temperature to a point at which the water of crystallization separates. The moist condition of the crystals ensures the presence of water vapor. The heat may be applied by the application of steam in the jacket 41 and the coil 48, the temperature of the steam being substantially 110° C. It is the purpose to bring the mass as rapidly as possible to a uniform temperature sufficiently high to cause substantial elimination of water of crystallization throughout the entire mass. The exact temperature at which the separation occurs has not been determined accurately nor is this necessary to the successful accomplishment of the purpose. The application of steam as described will furnish sufficient heat.

As soon as the separation of the water has occurred the vacuum is restored and the water and water vapor are drawn rapidly through the filter medium, leaving the anhydrous product thereon. When the water has been withdrawn as completely as possible the product may be washed with a suitable organic non-solvent for the hydrosulphite to remove any adhering traces of moisture. Drying is completed under vacuum at a temperature of from 50 to 60° C. while the mass is stirred.

The precipitated material in the filter 8, containing zinc and calcium compounds and all of the sulphur dioxide in the form of sulphites, is stirred into a convenient quantity of water and placed in a closed tank 14 as indicated in Fig. 1 which is provided with agitating means 15 and a heating jacket 16. Sulphuric acid is added and the solution is agitated to liberate sulphur dioxide which is returned for further use in the process. Zinc remains in solution as sulphate and the calcium compounds are converted into calcium sulphate. The latter, being substantially insoluble, may be separated from the zinc sulphate solution by filtration in a suitable filter 17 and the zinc sulphate may be recovered by evaporation.

As a specific example of the application of the invention, 208 kilos of sodium bisulphite are dissolved in 640 kilos of water and 65 kilos of zinc dust are added while the solution is agitated and cooled as hereinbefore described. Sulphur dioxide in proportion of substantially 64 kilos is then added slowly so that the temperature of the reaction does not exceed 38° C. When the reaction is complete milk of lime is added. The required amount of milk of lime may be prepared by adding 112 kilos of calcium oxide to 340 kilos of water. The mass is stirred for at least 20 minutes, and 148 grams of salt per liter of solution are then added and the mixture is filtered as hereinbefore described. The solution, together with the washings with a 14 per cent sodium chloride solution, are collected in the vacuum drier. 160 grams of salt per liter of solution are then added and the solution is stirred until the sodium hydrosulphite is crystallized therefrom. The drier is then closed and the salt solution is filtered off through the filter medium at the bottom of the drier. Steam or other heating medium is supplied to the jacket and coil in the vacuum drier and the temperature of the mass is raised to separate the water of crystallization. Suction is then applied to withdraw the water and water vapor. The mass may be washed several times with a suitable liquid such as ethyl alcohol or acetone and drying is completed at from 50 to 60° C. while the mass is stirred under vacuum.

The treatment of the residue from the filter 8 involves the use of the theoretical amount of sulphuric acid necessary to liberate the sulphur dioxide and to convert all the calcium and zinc compounds into sulphates. The calcium sulphate which is separated from the zinc by filtration as hereinbefore described is of slight value and may be discarded. The zinc sulphate recovered by evaporation and crystallization may be utilized for any desired purpose.

In Figs. 2 to 4 inclusive of the drawing, I have illustrated the preferred form of apparatus, in which water of crystallization is removed from the crystallized sodium hydrosulphite, it being understood, however, that the method herein described is not limited to the utilization of this particular form of apparatus. The improved vacuum drier and filter include a shell 18 which may be of any suitable material and is preferably cylindrical in form with heads 19 and 20. The shell should have sufficient strength to withstand the pressures resulting from the vacuum maintained therein. The shell is provided with pipes 21 and 22, the former being utilized for the introduction of washing liquids to the drier and the latter for the introduction of gases in releasing the vacuum. A man-hole 23 is provided in the head 20 and a suitable cover 24 is adapted to be secured thereto to close the man-hole. A sight-glass 25 is supported in the cover and held by a clamping ring 20' so that the contents of the drier may be observed. To facilitate examination of the contents of the drier a man-hole 27, preferably on the opposite side of the head 20, is provided with a sight-glass 28 held by a clamping ring 29, and an incandescent lamp 30 is supported by a reflector 31 above the sight-glass to insure illumination of the interior of the drier.

A shaft 32 is supported in bearings 33 and 34 respectively on the heads 19 and 20 and carries stirring blades 35 adjacent its lower end whereby the contents of the drier may be agitated. A beveled gear 36 is secured to the upper end of the shaft 32 and meshes with a beveled pinion 37 on a transverse shaft 38 mounted in suitable bearings in a bracket 39. A pulley 40 is secured to the shaft 38 whereby the shaft 32 and the blades 35 may be actuated.

Adjacent its lower end the shell 18 is provided with a jacket 41 having an inlet 42 for steam or other suitable heating medium and an outlet 43 whereby the condensate or spent heating medium may be withdrawn. Directly below the blades 35 a filter is supported on an annular bracket 44, the filter comprising a coarse meshed fabric 45 preferably of Monel metal and a layer 46 of filter cloth, also preferably of Monel metal. Strips 47 of Monel metal are secured above the filter cloth to hold it in proper position and to prevent contact of the stirring arms 35 therewith. Beneath the fabric 45 a coil 48 is provided, having its ends extending through the shell and adapted to be supplied with steam or other suitable heating medium. The purpose of the coil is to heat the filter and, operating in conjunction with the heating jacket 41, supply the necessary heat whereby the water of crystallization is separated from the crystallized sodium hydrosulphite.

A drain pipe 49 provides an outlet from the shell below the filter and may be connected to suitable suction means (not shown) whereby a reduced pressure is maintained in the chamber below the filter to ensure the rapid withdrawal of the water. Preferably a filling 50 of solder or other suitable material is disposed about the edge of the head 19 sloping toward the outlet 49 so that liquid passing through the filter drains readily to the outlet. It is to be understood that throughout the structure described various parts are constructed of metals such as copper or Monel metal which are not chemically affected by the reagents employed in the operation.

As the result of the application of the method herein described, it is possible to produce sodium hydrosulphite efficiently and economically on a commercial scale. The difficulties heretofore experienced, owing to the decomposition of the hydrosulphite during the drying operation, are entirely avoided in the practice of the method and by the utilization of the apparatus as described herein.

Various changes may be made in the details of the operation and of the apparatus employed without departing from the invention or sacrificing any of the advantages thereof.

I claim:

A method of preparing anhydrous sodium hydrosulphite, which comprises heating crystalline hydrosulphite in an atmosphere of water vapor to a temperature sufficiently high to release the water of crystallization and withdrawing the water and water vapor while maintaining the temperature of the anhydrous product at a point which precludes recombination of the water therewith.

In testimony whereof I affix my signature.

LLOYD K. RIGGS.